United States Patent [19]

Goulas

[11] 4,429,995
[45] Feb. 7, 1984

[54] TWO DIMENSINAL FLOW ANALYZER

[75] Inventor: Apostolos Goulas, St. Albans, England

[73] Assignee: National Research Development Corporation, London, England

[21] Appl. No.: 283,915

[22] Filed: Jul. 16, 1981

[30] Foreign Application Priority Data

Jul. 21, 1980 [GB] United Kingdom ................ 8023848

[51] Int. Cl.³ ...................... G01P 05/20; G01N 21/49
[52] U.S. Cl. ................................................... 356/343
[58] Field of Search .............................. 356/337–343, 356/335, 336

[56] References Cited

U.S. PATENT DOCUMENTS

| | | | |
|---|---|---|---|
| 2,788,702 | 4/1957 | Baum | 356/340 |
| 3,641,320 | 2/1972 | Stockham et al. | 356/335 |
| 3,809,480 | 5/1974 | Somerville et al. | 356/338 |
| 3,830,966 | 8/1974 | Hofstein | 356/335 |
| 3,941,477 | 3/1976 | Schodl | 356/342 |
| 4,206,999 | 6/1980 | Keller | 356/338 |

OTHER PUBLICATIONS

"Principles and Practice of Laser-Doppler Anemometry," by F. Durst, et al., *Academic Press*, 1976, pp. 1-3.
McCreath, C. G. et al., "A Technique for Measurement of Velocities and Size of Particles in Flames" J. Phys. E. Sci. Instrom. (GB), vol. 5, No. 6, 6/72.

*Primary Examiner*—Bruce Y. Arnold
*Attorney, Agent, or Firm*—Cushman, Darby & Cushman

[57] ABSTRACT

Apparatus for analyzing flowing fluid which contains light scattering particles comprises a light source; beam-expansion means to expand a light beam from the source to provide a two-dimensional sheet of light, there being at least a component of the fluid flow in the plane of said sheet; sensing means to sense light scattered by the particles; switch means arranged so that the sensing means senses scattered light only intermittently; and control and calculating means to calculate from the intermittently sensed light a property of the flow.

6 Claims, 7 Drawing Figures

TWO DIMENSINAL FLOW ANALYZER

This invention relates to the analysis of fluid flow in two, or sometimes three, dimensions when the flow is complex or turbulent and a picture of tracer particles in the flow is required. For example, fluid flow around compressor diffuser blades or in a mixing arrangement may need to be studied.

In the known technique of laser-Doppler anemometry, such as is described in "Principles and Practice of Laser-Doppler Anemometry" by F. Durst et al, pages 1 to 3, a single point within the flow field is studied. If a complete picture of flow is required, it must be built up point by point over a considerable period of time during which the flow must be steady; such a condition may be difficult to achieve. Further, it may be difficult to measure velocity by such a technique, and laser anemometry cannot be applied to particles larger than 800 microns in diameter.

In the present invention, a two dimensional picture of fluid flow can be built up quickly enough for on-line control to be possible, even for large tracer particles.

According to the invention, apparatus for analysing a flowing fluid which contains light-reflecting particles comprises a light source; expansion means to expand light from the source to provide a two-dimensional sheet of light, there being at least a component of the flow in the plane of said sheet; sensing means to sense light reflected by the particles; switch means arranged so that the sensing means senses reflected light only intermittently; and a calculating means to calculate from the intermittently sensed light a property of the flow. Preferably the recording means is a television camera or other camera which includes light receiving means in the form of a two-dimensional matrix.

In a preferred arrangement, the switch means is arranged to allow alternatively passage of light from the source to the flowing fluid and to intercept the light so that intermittent illumination is provided. In an alternative arrangement the illumination is continuous and the switch means is arranged to control the shutter of a photographic camera or to interrupt the high voltage supply to a television camera which allows intermittent exposure of the camera.

The light-reflecting particles may be inadvertently present, e.g. dust in a gas or liquid, or may be deliberately introduced. The particles may be solid particles in a gas or liquid, air bubbles in a liquid, or liquid bubbles in a gas. Preferably the optical arrangement is such that liquid scattered at an angle to the laser sheet is recorded. The angle of scattering is highly dependent on the scattering particles, but angles up to about 30° may be used. Usually the source will be a laser.

The record will be in the form of streaks of light, each streak corresponding to movement of one particle during one period of illumination or of camera exposure. By recording two or more streaks, the path of each particle can be traced and a picture of the flow in two dimensions provided. Since the interval during which the flow was recorded is known, the velocity of any particle can be measured, and flow velocity or turbulence can be calculated.

In one embodiment, there is further provided a focusing lens between the sheet of light and the sensing means; reciprocating means which supports the focusing lens; and first signal generating means arranged to provide a sweep signal to sweep the two-dimensional matrix along at least one direction and to reciprocate the lens in synchronism, whereby areas of the sheet of light are consecutively focused onto corresponding areas of the camera matrix.

In an alternative embodiment there is further provided a fixed focusing lens between the sheet of light and the sensing means, and the sensing means is arranged so that the two-dimensional matrix forms an angle with the plane of the lens, whereby a substantial area of the sheet of light is focused onto the camera matrix.

A further optional feature is that the apparatus comprises second signal generating means arranged to provide a sweep signal to sweep individual points of the two-dimensional matrix in a first, line-by-line mode until a matrix point is reached which senses light reflected by a particle, and in a second, subsequent search mode in which adjacent matrix points are located which have sensed light reflected by said particle during at least two consecutive intermittent sensing periods.

The invention will now be described by way of example only with reference to the accompanying drawings in which.

Figure 1:
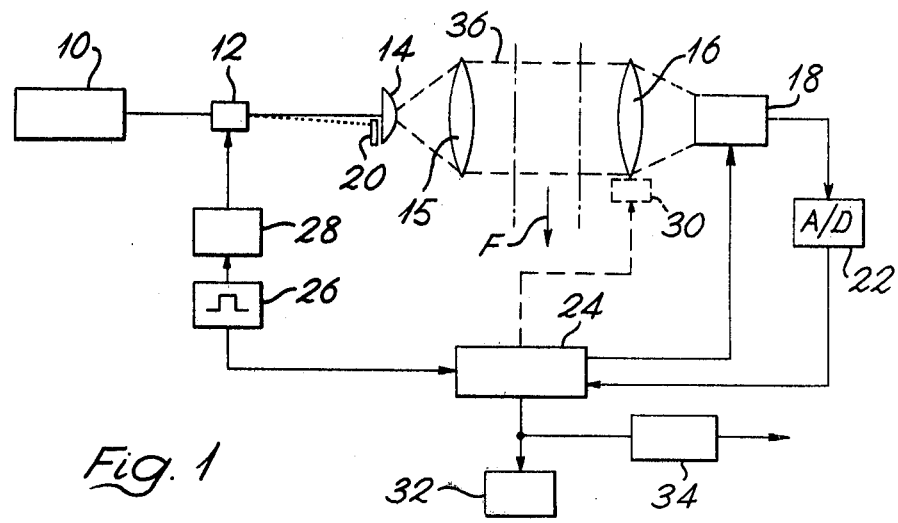
FIG. 1 illustrates schematically the main optical and electrical components of a flow analysis system according to the invention.

In FIG. 1 a laser 10 provides a beam of light which passes through an acousto-optic modulator 12 and a cylindrical lens 14 to a collimating lens 15, a focusing lens 16, and a television camera 18. The modulator 12 intermittently deflects the beam so that it is intercepted by a stop 20 slightly displaced from the axis of the apparatus, or allows the beam to pass to the lens 14.

The camera 18 is connected through an analogue-to-digital converter 22 to a control and calculating unit 24. A pulse generator 26 supplies the control unit 24, and is also connected through a radio frequency source 28 to the modulator 12. The control unit 24 controls the camera 18, and optional fast scan unit 30 to which the lens 16 is attached, a printer 32, and a flow control system 34.

The cylindrical lens 14 spreads the incident laser beam to form a fan-shaped beam which is collimated by the lens 15 to provide an illuminating sheet of light 36 typically 0.4 millimeters thick. The modulator 12 either allows passage of the laser beam or deflects it to the stop 20, so that the sheet of light is supplied intermittently, typically at a frequency of 40 megahertz.

The control and calculating unit 24 may be a microprocessor or a main frame computer or a dedicated logic system.

Suppose a flowing fluid crosses the sheet of light, the flow being indicated by reference F and the boundaries of the fluid being indicated by the chain-dotted lines. The flow F is shown parallel to the sheet of light 36 and transverse to the direction of the light rays. These are not essential conditions; so long as there is at least a component, preferably a major component, of the flow in the plane of the sheet of light then the invention can be applied. Suppose now that the fluid contains light-scattering particles, then when the sheet of light is present, the particles will scatter light and a streak of light will be visible for each particle each time the sheet of light is present. The length of each streak depends on the particle velocity in the plane of the sheet of light and the duration of the illuminating period.

Figure 2:
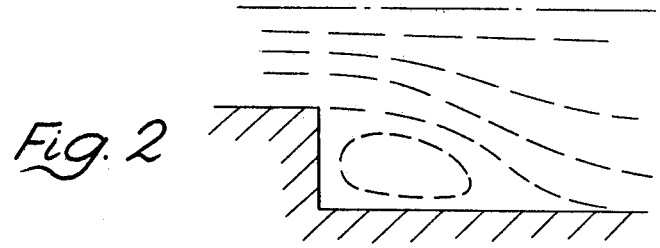
FIG. 2 shows a typical visualisation of an intermittently-illuminated flow field containing light-reflecting particles.

A typical picture of streak lines indicating gas flow behind a step is shown in FIG. 2.

Since the illumination time is known, the velocity of a particle in the plane of the sheet of light 36 can be calculated by measuring the length of one streak of light. In practice, it is advisable to measure the length of two consecutive full streaks to confirm that the correct streak length has been recorded; in fact a total length of 2.2. streaks is used, i.e. two full streaks plus the ends of the preceding and succeeding streaks.

The television camera 18 records such a picture such as FIG. 2, and the camera by its nature provides a two-dimensional matrix which is utilised in analysis of the flow. The video signal from the camera is digitised by the A/D converter 22 so that for every position in the camera matrix a binary signal corresponding to the presence "1" or absence "0" of light is provided. The calculating and control means 24 is programmed for two types of sweep (a) a conventional television sweep to search for binary "1"s and (b) a search sweep to search the area around a binary "1" to trace the streak lines as quickly as possible.

The length and direction of the required number of consecutive light streaks is thus recorded, is temporarily stored, and the velocity of the corresponding particle calculated by the calculating means 24. From measurements corresponding to several particles, mean flow velocity or turbulence can be calculated.

Figure 3:
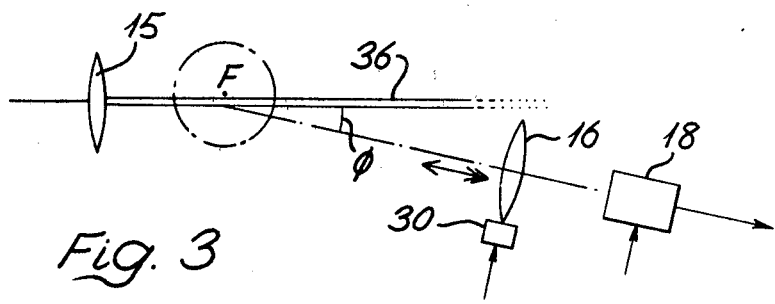
FIG. 3 illustrates the optical parts of FIG. 1 in more detail.

Since the direction of maximum scattering varies with particle size, viewing the sheet of light at right angles, as in FIG. 2, is not the most effective direction, and the lens 16 and camera 18 are positioned to receive light scattered forward at an angle of about 30° as shown in FIG. 3. This angle has been found to give acceptable results for a wide range of particle sizes. The problem then arises that only a certain strip of the sheet of light 36 in the region of the fluid flow can be focused by the lens 16 onto the camera 18.

The depth of field D, i.e. the distance measured normal to the television camera 18 on either side of the focusing point within which a sharp image can be obtained, is given by the relationship:

$$D \simeq 2n\alpha q^2/f \qquad (1)$$

where f/n is the diameter of the effective aperture, f is the focal length of the lens 16, q is the distance of the focusing point from the lens 16, and α is a constant, usually 0.0005. Typically f=0.05 meters, q=0.20 meters so that D=0.4 millimeters. This is also the thickness of the illuminating sheet of light.

When the FIG. 3 optical arrangement is used, the depth field D must be greater than the width of the field of observation times sin φ, where φ is illustrated in FIG. 3.

In one arrangement which meets this requirement the optical fast scan unit 30 to which the lens 16 is attached is provided. The camera 18 is focused on a strip of the laser sheet of width, for example, 10 television lines and is instructed by the control unit 24 to sweep along the strip, the unit 24 also causing the lens 16 to move in synchronism with the picture-generating sweep to keep the area of flow being scanned in focus on the camera 18. The movement of the lens is axial, as indicated by the double headed arrow, one direction corresponding to line scan and the other to the return movement at the end of a scan.

Since the laser sheet 36 is viewed obliquely, the apparent lengths of the streak lines must be corrected during the calculation of velocity.

Figure 4:
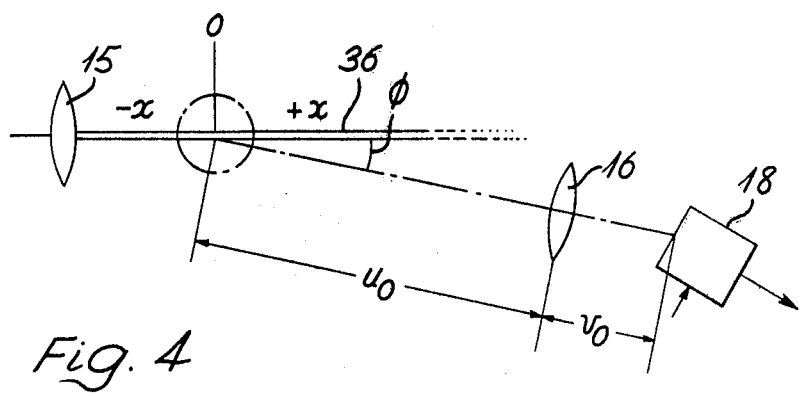
FIG. 4 illustrates an optical arrangement which is an alternative to FIG. 3.

An alternative arrangement for focusing an obliquely-viewed sheet of light is shown in FIG. 4. The fast scan unit 30 is omitted so that the lens 16 is fixed in position, but the camera 18 is tilted with respect to the axis so that the major part of the sheet of light 36 in the region of the flow F is focused by the lens 16 on the tilted receiving plane of the camera 18.

If the lens 16 is distance $u_o$ from the centre of the illustrated flow, and if f is the focal length of the lens 16, then:

$$v_o = (fu_o/(u_o - f)) \qquad (2)$$

Any point in the illuminated flow can be expressed as a function of the distance x from the origin at 0. The distance u of each point in the illuminated flow from the centre of the lens 16 will be:

$$u = u_o + x \cos \phi \qquad (3)$$

Substituting (3) in (2) and rearranging gives:

$$v = \frac{u_o v_o (u_o + x \cos \phi)}{u_o^2 + (u_o + v_o) x \cos \phi} \qquad (4)$$

Using series expansion: n= ∞

$$v = v_o - \frac{v_o^2}{u_o^2} x \cos \phi \sum_{n=o} (-1)^n \left[ \frac{(u_o + v_o) x \cos \phi}{u_o^2} \right]^n \qquad (5)$$

When the expression in square brackets in equation (5) is small:

$$v \simeq v_o - \frac{v_o^2}{u_o^2} x \cos \phi \qquad (6)$$

and the sheet of light illuminating the flow will be focused on the face of the camera 18.

For the typical values f=0.05 meters, $u_o$=0.2 meters and x=±0.015 meters, equation (6) holds.

In practice the FIG. 4 arrangement will be satisfactory for small illuminated areas, otherwise the scanned lens arrangement of FIG. 3 is preferable.

Figure 5:
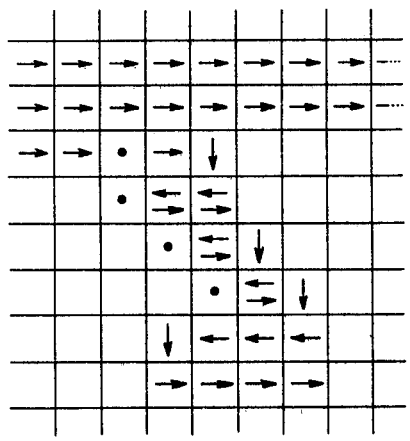
FIG. 5 shows a matrix search pattern.

Considering the more detail the matrix sweeps to search for high intensity areas of the receiving matrix corresponding to streak lines, a part of the matrix is illustrated in FIG. 5, with high intensity matrix points indicated by the dots. The small arrows indicate the two types of scan. From the top lefthand corner the line sweep follows the conventional television pattern, sweeping consecutively two full lines and a part of a third before a "1" is found. The matrix points around that point are then swept in the search sweep, the "pointer" moving a predetermined number of points to the right, in this example two points, before moving down and sweeping the next line from right to left. As each "1" is found, the search sweeping pattern is repeated. After the fourth "1" in the illustrated matrix, the sweep moves a predetermined number of matrix points to the left, in this case four points, and then the same number to the right, to confirm that the final "1" has been located.

This search sweep pattern is continued until the required two full streak lines plus the end and beginning of the preceding and succeeding streak lines have been located. The line sweep then restarts at another area of the matrix.

From the coordinates of the matrix points at which "1"s are located, the length and direction of the streak line and therefore the velocity of the particle causing it, can be calculated by the calculating and control means 24, which also provides the x-scan and y-scan signals in the required patterns.

The use of a search sweep instead of sweeping the whole matrix in the normal television camera pattern allows the measurement of significantly higher particle velocities, but the major advantage is that information about the flow pattern can be gathered sufficiently quickly (within a few seconds) for the calculating and control unit 24 to provide an output signal to the flow control system 34 (FIG. 1). It is believed that this is the first time that an on-line flow analysis system has been possible.

The use of a matrix search sweep also allows the measurement of the velocity and, if required, any changes of shape, of a bubble moving with the fluid.

The problem with the measurement of bubble velocity is to locate the same part of a large bubble after a relatively long time interval even though the bubble shape may change. In the present invention, the outline of a bubble is recorded as a sequence of "1"s in the matrix points; the outline is traced continuously by the matrix search sweep until the smae identifiable point has been reached twice.

Figure 6A:
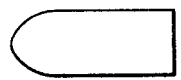
FIG. 6(a) shows the shape of a bubble in a flowing fluid.
Figure 6B:
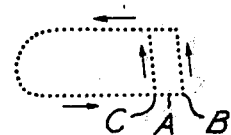
FIG. 6(b) illustrates its outline as traced on a recording matrix.

Referring now to FIG. 6, FIG. 6(a) shows a bubble outline in the bullet-shape typical of bubbles in flowing fluids. FIG. 6(b) shows the effect of following the bubble shape on a recording matrix which is swept to trace the bubble outline as quickly as possible.

Suppose the matrix sweep starts at point A and follows a bubble outline in the arrowed dirction round the "corner" B at which there is a sharp change of direction. As the rear face of the moving bubble is traced, the movement will continuously displace it so that the trace is slightly angled. The matrix search sweep then follows the outline along the side and past the leading face of the bubble, which will also be slightly distorted by the continued movement. As the sweep returns to the "corner" at the rear face, it is now found to be displaced, and at point C. The distance between B and C, plus the time between the two sweeps to reach these clearly identifiable points, can be used to calculate bubble velocity.

Bubble shape changes can also be sensed if required.

Using an Argon laser velocity of bubbles up to a length of 3 centimeters can be measured by this method, and again the measurement is on-line, allowing control of the system. In a measurement of particle velocity according to the invention, fluid flow will usually be parallel to the illuminating sheet of light, which will be very narrow, typically 0.4 millimeters thick with an area about 4 centimeters square. Any velocity component perpendicular to the sheet will not be sensed but will increase the uncertainty of the measurement.

In a variation of the method, two or more spaced parallel illuminating sheets are provided at different wavelengths, so that two pictures of fluid flow in different colours are produced simultaneously, or two spaced sheets can be provided alternately. The arrangements allow the study of flow components perpendicular to the illuminating sheets. A holographic recording can also be used to study three dimensional flow.

It is also essential to consider the relative size of the tracer particles—small particles will follow fluid flow in detail, while larger particles will not. It has been found that in gas flows, particles greater than 5 microns in diameter cannot follow rapid velocity changes, e.g. turbulence having a frequency greater than 100 Hz. In liquid flow, particles of up to 15 microns diameter can follow velocity changes up to 4 kHz. Particles up to about 100 microns will follow mean fluid flow.

Typically, velocity up to 150 meters per second can be measured to between 2.5 and 5%.

All of the quantified examples above refer to the use of an Argon laser. Clearly, if a more powerful laser is provided, more scattered light will be available, and the limits will vary accordingly.

In a major variation, not illustrated, the modulator 14 is omitted so that the illuminating sheet of light is continuously present, and the control circuit 24 controls a switch or shutter in the camera 18 to provide intermittent recording of continuous streak lines.

I claim:

1. Apparatus for analysing flowing fluid which contains light-scattering particles comprising a light source; beam-expansion means to expand a light beam from the source to provide a two-dimensional planar sheet of light, there being at least a component of the fluid flow in the plane of said sheet; camera sensing means having light receiving means in the form of a two-dimensional matrix to sense light scattered by the particles; switch means arranged to allow intermittent illumination of the flowing fluid so that the sensing means senses scattered light only intermittently; and calculating means to calculate from the intermittently-sensed light a property of the flow; said apparatus further including a focusing lens between the sheet of light and the camera, reciprocating means which supports the focusing lens, and first signal generating means arranged to provide a sweep signal to sweep the two-dimensional matrix along at least one direction and to reciprocate the lens in synchronism, whereby areas of the sheet are consecutively focused onto corresponding areas of the camera matrix.

2. Apparatus according to claim 1 further comprising second signal generating means arranged to provide a sweep signal to sweep individual points of the said recited two-dimensional matrix in a first, line-by-line mode until a matrix point is reached which senses light scattered by a particle, and in a second, subsequent search mode in which adjacent matrix points are located which have sensed light scattered by said particle during at least two consecutive intermittent sensing periods.

3. Apparatus according to claim 2 in which there is further provided a fixed focusing lens between the sheet of light and the camera, and the camera is arranged so that the said recited two-dimensional matrix forms an angle with the plane of the lens, whereby a substantial area of the sheet of light is focused onto the matrix.

4. Apparatus as claimed in claim 3 wherein the camera is arranged to receive light along a direction which makes an acute angle with the sheet of light.

5. Apparatus for analysing a flowing fluid which contains light-scattering particles comprising: a laser source; an opto-acoustic modulator which intermittently intercepts and allows passage of a beam of light from the laser; a cylindrical lens which refracts said beam to form a two-dimensional sheet of light, there being at least a component of the fluid flow in the plane of said sheet; a television camera arranged to receive light scattered at an acute angle from said sheet; and calculating means arranged to calculate from the light received by the television camera a property of the flow.

6. A method of analysing a flowing fluid which contains light-scattering particles comprising: illuminating the flowing fluid with a two-dimensional planar sheet of light so that there is at least a component of said flow in the plane of the sheet; intermittently sensing light scattered by the particles whilst synchronously reciprocating the sensing means in order to scan consecutive areas of the sheet; and, from the intermittently-sensed light, calculating a property of the flow.

* * * * *